United States Patent [19]

Gee

[11] Patent Number: 5,152,924

[45] Date of Patent: Oct. 6, 1992

[54] RUST INHIBITING SILICONE EMULSIONS

[75] Inventor: Ronald P. Gee, Midland, Mich.

[73] Assignee: Dow Corning Corporation, Midland, Mich.

[21] Appl. No.: 532,476

[22] Filed: Jun. 1, 1990

[51] Int. Cl.$^5$ .......................... B01J 13/00; B05D 3/02
[52] U.S. Cl. ............................... 252/312; 252/400.31; 427/388.4; 524/588
[58] Field of Search .............. 252/312, 315.01, 400.31, 252/353; 524/588; 427/388.4

[56] References Cited

U.S. PATENT DOCUMENTS

| | | | |
|---|---|---|---|
| 2,891,920 | 6/1959 | Hyde et al. | 260/29.2 |
| 2,894,913 | 7/1959 | Sullivan et al. | 252/358 |
| 3,294,725 | 12/1966 | Findlay et al. | 260/29.2 |
| 4,559,227 | 12/1985 | Chandra et al. | 424/70 |
| 4,775,505 | 10/1988 | Kuroda et al. | 264/82 |
| 4,902,499 | 2/1991 | Bolish, Jr. et al. | 424/70 |
| 4,908,140 | 3/1990 | Bausch et al. | 252/8.6 |
| 5,000,861 | 3/1991 | Yang | 252/8.6 |
| 5,049,377 | 9/1991 | Lamb et al. | 424/70 |
| 5,057,572 | 10/1991 | Chrobaczek et al. | 524/588 |
| 5,064,694 | 11/1991 | Gee | 427/387 |

FOREIGN PATENT DOCUMENTS 0344334  5/1988  European Pat. Off. .

Primary Examiner—Robert L. Stoll
Assistant Examiner—N. Bhat
Attorney, Agent, or Firm—Sharon K. Severance

[57] ABSTRACT

Disclosed are emulsions which do not rust or corrode steel surfaces and further do not contain rust or corrosion inhibiting additives. The emulsions encompassed in this invention are produced using mechanical or emulsion polymerization emulsification methods. The mechanically produced emulsions must contain at least one cationic surfactant containing an anion which has a parent acid with a p$K_a$ of 3 or greater. The emulsion produced using emulsion polymerization methods are produced from (A) at least one cationic surfactant containing an anion which has a parent acid with a p$K_a$ of 3 or greater; (B) a basic or strongly basic catalyst; and (C) a catalyst neutralizer selected from acids having a p$K_a$ of 3 or greater and having the capability of neutralizing the catalyst. These emulsions are useful in applications where they might come in contact with steel surfaces.

12 Claims, No Drawings

RUST INHIBITING SILICONE EMULSIONS

This invention pertains to silicone emulsions which do not corrode or rust metal surfaces that they come in contact with. The rust inhibiting properties are produced through the use of specific cationic surfactants. The need for the addition of rust inhibitors is eliminated.

BACKGROUND OF THE INVENTION

It is well known that contacting steel with water will result in corrosion or rust on the surfaces of the steel. Likewise, aqueous silicone emulsions tend to rust or corrode steel surfaces to which they may be applied or come in contact with. Because of the ability of the silicone emulsion to corrode or rust steel surfaces, they must be used in applications wherein they do not come in contact with steel. If the emulsions are used in applications wherein they come in contact with steel, additives which prohibit the corrosion or rusting of the surface must be added into the silicone emulsion. The practice of adding rust inhibiting additives into silicone emulsions is taught in U.S. Pat. No. 2,894,913 to Sullivan et al. The '913 patent states that rust inhibitors may be added but does not further exemplify what compounds may fall into the class of rust inhibitors.

There are several compounds known in the art as rust inhibitors that may be added into the silicone emulsions. These include sodium benzoate and sodium nitrite. These compounds are typically added into the silicone emulsion at levels of 0.1 to 1% by weight of the total emulsion. It is especially difficult to find rust inhibitors which are useful in emulsions containing quaternary ammonium chloride surfactants.

It is an object of this invention to show silicone emulsion compositions which do not rust or corrode steel surfaces and further do not contain additives for inhibiting rust.

It is further an object of this invention to show the rust inhibiting silicone emulsions which are produced by mechanical emulsification methods comprising cationic surfactants containing an anion whose parent acid has a $pK_a$ of at least 3.

It is further an object of this invention to show the rust inhibiting silicone emulsions which are produced by emulsion polymerization emulsification methods whereby the reactants comprise cationic surfactants containing an anion whose parent acid has a $pK_a$ of 3 or greater, basic catalysts and catalyst neutralizers selected from acids having a $pK_a$ of at least 3.

THE INVENTION

The object of this invention is obtained through the use of specific components when producing silicone emulsions. When using mechanical emulsification methods, a specific cationic surfactant must be used. When using emulsion polymerization emulsification methods, a specific cationic surfactant, a basic catalyst and a specific catalyst neutralizer must be used.

The silicone emulsions encompassed by this invention are standard, fine and micro silicone emulsions produced using mechanical or emulsion polymerization emulsification methods. Mechanical emulsification methods to produce oil-in-water emulsions are well known in the art and can be used to produce rust inhibiting silicone emulsions of this invention. Methods for producing the rust inhibiting emulsions of this invention by mechanical emulsification may be found in the text "Emulsions: Theory and Practice", by P. Becker (Reinhold Publishing Co, 1965). Methods known in the art for producing rust inhibiting silicone emulsions using emulsion polymerization include U.S. Pat. No. 3,294,725 to Findlay et al., U.S. Pat. No. 2,891,920 to Hyde et al., U.S. patent application Ser. No. 07/439,751 to Tanaka et al., and U.S. patent application Ser. No. 07/532,471 entitled "Method for Making Polysiloxane Emulsions" to Gee, filed concurrently, commonly owned; all herein incorporated by reference. Additional methods, not mentioned herein, however known in the art, may also be useful in producing the rust inhibiting emulsions.

Although any of the above mentioned methods may used to produce the silicone emulsion, specific components, in particular, the cationic surfactant, must be used when producing the silicone emulsions which have rust or corrosion inhibiting properties. In addition to the cationic surfactants, basic catalysts, and specific catalyst neutralizers must be used when producing the emulsions using emulsion polymerization emulsification methods.

Although the use of a specific cationic surfactant is necesary for either method when producing the rust inhibiting emulsions, it is not necessary to have the specific cationic surfactant present during the formation of the emulsion. For example, the rust inhibiting silicone emulsions could be produced by adding at least one cationic surfactant selected from cationic surfactants containing an anion having a parent acid with a $pK_a$ of about 3 or greater to anionic emulsion polymers produced by the method of Findlay in U.S. Pat. No. 3,294,725 or other methods known in the art which essentially employ anionic or nonionic surfactants during the production of the emulsion.

The mechanical emulsification method typically entails emulsifyinc a silicone polymer in water in the presence of at least one surfactant. In the instant invention it is preferred that there be present at least one cationic surfactant selected from those containing a anion whose parent acid had a $pK_a$ of about 3 or greater. The silicone polymers are typically linear or branched or mixtures thereof and may further be mixtures containing some cyclicsiloxanes. Any silicone polymer that is know in the art and capable of being emulsified using mechanical methods to produce an emulsion containing at least one cationic surfactant is useful in the instant invention.

The useful cationic surfactants are selected from those containing an anion which has a parent acid with a $pK_a$ of about 3 or greater. These anions include, but are not limited to, borate (boric acid, $pK_a=9$), acetate (acetic acid, $pK_a=4.7$), benzoate (benzoic acid, $pK_a=4.2$), glycolate (glycolic acid, $pK_a=3.8$), lactate (lactic acid, $pK_a=3.8$), and citrate (citric acid, $pK_a=3.1$). Preferred are those cationic surfactants containing anions whose parent acids have a $pK_a$ of 4 or greater. The silicone emulsions must contain at least 0.01 percent by weight and more preferably 0.05 percent by weight of the cationic surfactant based on the total weight of the emulsion to inhibit corrosion or rust.

The cationic surfactants useful in producing rust inhibiting silicone emulsions can be exemplified by aliphatic amines and their derivatives, homologues of aromatic amines having fatty chains, derivatives of ethylene diamine, quaternary ammonium compounds, amine salts of long chain fatty acids, quaternary ammonium bases of the benzimidazolines, basic compounds or pyridinium and its derivatives, sulfonium compounds, quaternary compounds of betaine urethanes of ethylene diamine, polyethylenediamine, and polypropanolpolyethanol amines.

The preferred cationic surfactants are those that contain acetate functionality such as quaternary ammonium acetate, dodecylamine acetate, octadecylamine acetate, acetates of the amines of tallow fatty acids, tallow trimethyl ammonium acetate, dioctadecyldimethyl ammonium acetate, didodecyldimethyl ammonium acetate, dihexadecyldimethyl ammonium acetate, octadecylsulfonium acetate and others. These acetate containing surfactants can be further exemplified by ETHOQUAD T13/ACETATE, and ARMAC HT sold by AKZO CHEMICALS, INC., and others.

When producing the emulsions with rust or corrosion inhibiting properties using emulsion polymerization emulsification methods, it is necessary to use a basic catalyst and a catalyst neutralizer selected from acids having a $pK_a$ of greater than 3 and having the capability of neutralizing the catalyst in addition to the cationic surfactant described above. The emulsion polymerization method typically entails reacting a siloxane monomer or oligomer to form a polymer while simultaneously forming the emulsion of the silicone polymer. The polymerization reaction typically uses a catalyst while the formation of the emulsion requires the aid of at least one surfactant. Once the desired silicone polymer is formed in the emulsion, the catalyst is neutralized to prevent further polymerization.

The silicone emulsions produced using emulsion polymerization typically use cyclicsiloxanes as the major reactant in the formation of the silicone polymers. Hydrolyzable silanes may be added with the cyclicsiloxane reactants to produce copolymers in the emulsion. Useful silicone reactants are taught in U.S. Patent Application entitled "Method for Making Polysiloxane Emulsions" by Gee, filed concurrently, commonly owned, herein incorporated by reference. Preferred silicone emulsions are those produced using cyclicsiloxane and more preferably using octamethylcyclotetrasiloxane or mixtures of octamethylcyclotetrasiloxane and decamethylcyclopentasiloxane as the reactant.

The catalyst for the polymerization reaction is preferably selected from basic and more preferably strongly basic materials which are known in the art for the polymerization of cyclicsiloxanes or mixtures of cyclicsiloxanes and hydrolyzable silanes. Suitable catalysts include, but are not limited to, sodium hydroxide, potassium hydroxide, lithium hydroxide, and others.

The catalyst neutralizers useful in producing the rust inhibiting silicone emulsions are selected from acids having a $pK_a$ of about 3 or greater and having the capability of neutralizing bases. The preferred acids are those having a $pK_a$ of 4 or greater and capable of neutralizing the catalyst. Acids useful in the instant invention include, but are not limited to, acetic acid, benzoic acid, glycolic acid, lactic acid, citric acid and boric acid. The amount of catalyst neutralizer necessary is an amount that sufficiently neutralizes the catalyst and produces an emulsion with a pH of less than 7. Some known compounds have a $pK_a$ of greater than about 3, such as water ($pK_a = 15.74$) and methanol ($pK_a = 15.5$), however they do not have the capability to neutralize the catalyst and therefore are not useful in the instant invention as catalyst neutralizers.

The rust inhibiting silicone emulsions produced by either mechanical emulsification method or emulsion polymerization emulsification methods may additionally contain nonionic surfactants, preservatives, fungicides, antioxidants and others. Preferred nonionic surfactants are those having an HLB of greater than 10.

The rust inhibiting silicone emulsions are useful in polishes, textiles, and other areas where aqueous emulsions may cause corrosion of metal surfaces.

So that those skilled in the art can understand and appreciate the invention taught herein, the following examples are presented, being it understood that these examples should not be used to limit the scope of this invention over the limitations found in the claims attached hereto.

EXAMPLE 1

A microemulsion was produced by the method as taught in the U.S. Patent Application by Gee, entitled "Method for Making Polysiloxane Emulsions", filed concurrently, commonly owned. The microemulsion was produced by mixing together 229.45 grams of water, 20 grams of TERGITOL 15S12, 60 grams ETHOQUAD T13/ACETATE, and 175 grams of cyclicsiloxanes having an average of 4 Si atoms per molecule. The mixture was heated to 95° C. 5 grams of 20% sodium hydroxide was added. The mixture was stirred at 95° C. for 4 hours. A 25 ml sample was taken and neutralized with 0.38 grams of 20% acetic acid (Microemulsion A).

Another 25 ml sample was taken and neutralized with 0.15 grams of 85% phosphoric acid. (Microemulsion B)

A 2.14 gram portion of each microemulsion was diluted with tap water to produce a 25 gram sample. A 6 mil coating was made with each microemulsion on steel "Type S" Q-panels purchased from The Q-Panel Company, Cleveland, Ohio. Observations were made for the appearance of rust at 30 minutes, 45 minutes, 1 hour and 3 hours. The results are given Table 1. After 11 days there was no sign of rust on the panel coated with microemulsion A.

TABLE 1

| TIME | MICROEMULSION | |
|---|---|---|
| (hrs.) | A | B |
| 0.5 | No Rust | Trace Rust around lower edge |
| 0.75 | No Rust | Considerable rust color on panel |
| 1 | No Rust | More rust color and visible rust on panel |
| 3 | No Rust | Severe Rust |

EXAMPLE 2

A microemulsion was produced by the method as taught in the U.S. patent application Ser. No. 07/532,471 by Gee, entitled "Method for Making Polysiloxane Emulsions", filed concurrently, commonly owned. The microemulsion was produced by mixing together 787.5 grams of water, 82.3 grams of TERGITOL 15S12, 180.3 grams ETHOQUAD T13/ACETATE, and 525 grams of cyclicsiloxanes having an average of 4 Si atoms per molecule. The mixture was heated to 85° C. 6.1 grams of 50% sodium hydroxide was added. The mixture was allowed to react until a particle size of 62 nanometers was achieved. 138.3 grams of water and 0.53 grams of KATHON LX1.5 was added. The mixture was divided into 8 parts of 210 grams each. Each part was neutralized with a different acid (Table 2) until the pH was below 7.

The microemulsions were diluted to 1% silicone using deionized water. 6 mil coatings of each diluted microemulsion were made on steel Q Panels. Observations for rust were made at 15 minutes, 1 hour, 4 hours and 1 day. Results are given in Table 3.

TABLE 2

| SAMPLE | ACID |
|---|---|
| 1 | 9.24 grams of 0.1N hydrochloric acid |
| 2 | 1.06 grams of 85% phosphoric acid |
| 3 | 0.675 grams glacial acetic acid |
| 4 | 1.35 grams solid benzoic acid |
| 5 | 0.825 grams solid glycolic acid |
| 6 | 1.18 grams of 85% lactic acid |
| 7 | 2.13 grams of solid citric acid |
| 8 | 0.68 grams of solid boric acid |

TABLE 3

| SAMPLE | RUST OBSERVATIONS | | | |
|---|---|---|---|---|
| | 15 MIN. | 1 HOUR | 4 HOURS | 1 DAY |
| 1 | No Rust | 1 spot (2 mm) | 1 spot (3 mm) | 1 spot (3 mm) |
| 2 | No Rust | 1 spot (10 mm) | 20% of panel | 20% of panel |
| 3 | No Rust | No Rust | No Rust | No Rust |
| 4 | No Rust | No Rust | No Rust | No Rust |
| 5 | No Rust | No Rust | No Rust | No Rust |
| 6 | No Rust | No Rust | No Rust | No Rust |
| 7 | No Rust | No Rust | No Rust | No Rust |
| 8 | No Rust | No Rust | No Rust | No Rust |

EXAMPLE 3

A microemulsion was prepared by the method taught in U.S. patent application entitled "Method for Making Polysiloxane Emulsions" by Gee, commonly owned, filed concurrently. The microemulsion was prepared by combining 46.17 parts water, 12 parts ETHOQUAD T13/ACETATE and 5.5 parts of TERGITOL 15S12. 35 parts of cyclicsiloxanes with an average of 4 Si atoms per molecule were added. The mixture was heated to 85° C. and 1 part of 20% Sodium Hydroxide was added to catalyze the polymerization reaction. The mixture was held at 85° C. for 5 hours with agitation. 0.3 parts of glacial acetic acid was added to neutralize the solution. When the emulsion solution had cooled, 0.02 parts of Kathon LX 1.5 (a preservative) was added.

Three samples of the microemulsion were diluted to 1.5% silicone (Sample 1), 1.0% silicone (Sample 2) and 0.5% silicone (Sample 3) using tap water. The hardness of the tap water was 7 ppm. The microemulsions were then each coated onto a "Type S" Steel Q-panel. For comparison only the tap water (Sample 4) was coated on a 4th panel. The amount of rust seen on the panels are given in Table 4.

TABLE 4

| SAMPLE | | RUST OBSERVATIONS | | |
|---|---|---|---|---|
| | | 15 MIN. | 1 HOUR | 1 WEEK |
| 1 | 1.5% | No Rust | No Rust | No Rust |
| 2 | 1.0% | No rust | No Rust | No Rust |
| 3 | 0.5% | No Rust | No Rust | No Rust |
| 4 | Tap Water | 25% Rust | 100% Rust | 100% Rust |

What is claimed is:

1. An emulsion composition produced through emulsion polymerization wherein the components used in producing the emulsions comprises
   (a) a cyclicsiloxane
   (b) at least one cationic surfactant containing an anion which has a parent acid with a $pK_a$ of 3 or greater
   (c) a basic catalyst; and
   (d) a catalyst neutralizer selected from acids having a $pK_a$ of 3 or greater and having the capability of neutralizing the catalyst; and
   (e) water.

2. The composition as claimed in claim 1 wherein the cationic surfactant contains acetate anions.

3. The composition as claimed in claim 1 wherein the catalyst is sodium hydroxide.

4. The composition as claimed in claim 1 wherein the catalyst neutralizer is selected from acids having a $pK_a$ of 4 or greater and having the capability of neutralizing the catalyst.

5. The composition as claimed in claim 1 wherein the cationic surfactant is a quaternary ammonium acetate compound.

6. The composition as claimed in claim 1 wherein the catalyst neutralizer is acetic acid.

7. The composition as claimed in claim 1 wherein the catalyst neutralizer is benzoic acid.

8. The composition as claimed in claim 1 wherein the catalyst neutralizer is glycolic acid.

9. The composition as claimed in claim 1 wherein the catalyst neutralizer is lactic acid.

10. The composition as claimed in claim 1 wherein the catalyst neutralizer is citric acid.

11. The composition as claimed in claim 1 wherein the catalyst neutralizer is boric acid.

12. A method of preventing rust or corrosion on a steel surface which contacts aqueous emulsions, the method comprising using the composition as claimed in claim 1 as the emulsion contacting the steel surface.

* * * * *